United States Patent
Sychev et al.

(10) Patent No.: US 11,228,780 B2
(45) Date of Patent: Jan. 18, 2022

(54) INTER PREDICTION APPARATUS AND METHOD FOR VIDEO CODING

(71) Applicant: HUAWEI TECHNOLOGIES CO., LTD., Guangdong (CN)

(72) Inventors: Maxim Borisovitch Sychev, Moscow (RU); Georgy Aleksandrovich Zhulikov, Voronezh (RU); Timofey Mikhailovich Solovyev, Moscow (RU)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/032,416

(22) Filed: Sep. 25, 2020

(65) Prior Publication Data
US 2021/0014521 A1  Jan. 14, 2021

Related U.S. Application Data (63) Continuation of application No. PCT/RU2018/000190, filed on Mar. 26, 2018.

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/176* (2014.11); *H04N 19/182* (2014.11);
(Continued)

(58) Field of Classification Search
USPC .................................................. 375/240.16
See application file for complete search history.

(56) References Cited

U.S. PATENT DOCUMENTS

| 8,908,767 | B1 | 12/2014 | Holmer |
| 2016/0366416 | A1* | 12/2016 | Liu ...................... H04N 19/109 |

(Continued)

FOREIGN PATENT DOCUMENTS

| JP | H09266573 A | 10/1997 |
| WO | 2016165617 A1 | 10/2016 |

OTHER PUBLICATIONS

M. E. Al-Muallal et al. "Motion Field Interpolation for Improved Motion Compensation and Frame-Rate Conversion", 2003 International Conference on Visual Information Engineering VIE 2003,Jul. 7, 2003, p. 17-20, XP055515640.
(Continued)

*Primary Examiner* — Behrooz M Senfi
(74) *Attorney, Agent, or Firm* — Womble Bond Dickinson (US) LLP (57) ABSTRACT

A method for inter prediction of a sample value of a current pixel of a plurality of pixels of a current block of a current frame of a video signal is proposed. The method (800) comprises: determining (801) a plurality of block-wise motion vectors related one-to-one to a plurality of blocks of the current frame; determining (803) a pixel-wise motion vector of the current pixel based on the plurality of block-wise motion vectors; determining one or more reference pixels in the reference frame based on the pixel-wise motion vector of the current pixel; and determining (805) an inter predicted sample value of the current pixel based on one or more sample values of the one or more reference pixels in the reference frame. Coding efficiency is thus improved.

18 Claims, 10 Drawing Sheets

(51) Int. Cl.
*H04N 19/182* (2014.01)
*H04N 19/169* (2014.01)
*H04N 19/523* (2014.01)
*H04N 19/80* (2014.01)

(52) U.S. Cl.
CPC ....... *H04N 19/1883* (2014.11); *H04N 19/523* (2014.11); *H04N 19/80* (2014.11)

(56) References Cited

U.S. PATENT DOCUMENTS

| | | | |
|---|---|---|---|
| 2016/0366435 A1 | 12/2016 | Chien et al. | |
| 2017/0180753 A1* | 6/2017 | Kim | H04N 19/124 |
| 2017/0237981 A1 | 8/2017 | Karczewicz et al. | |
| 2020/0228810 A1* | 7/2020 | Batard | H04N 19/436 |
| 2021/0037258 A1* | 2/2021 | Zhang | H04N 19/31 |
| 2021/0051340 A1* | 2/2021 | Xiu | H04N 19/57 |

OTHER PUBLICATIONS

Li Li et al, "An Efficient Four-Parameter Affine Motion Model for Video Coding", arXiv:1702.06297v1 [cs.MM] Feb. 21, 2017,Feb. 21, 2017, XP080747890.
Hyo-Sung Kim et al, "Zoom Motion Estimation Using Block-Based Fast Local Area Scaling", IEEE Transactions on Circuits and Systems for Video Technology, Institute of Ekectrical and Electronics Engineers, US,vol. 22, No. 9, Sep. 1, 2012 (Sep, 1, 2012), p. 1280-1291, XP011459686.
Wikipedia, "Bilinear interpolation", Nov. 10, 2017 (Nov. 10, 2017), p. 1-3, Retrieved from the Internet: URL:https://en.wikipedia.org/w/index.php?title=Bilinear_interpolationandoldid=809623103 XP055515648.
Zhang Na et al, "Merge Mode for Deformable Block Motion Information Derivation", IEEE Transactions on Circuits and Systems for Video Technology, vol. 27, No. 11, Nov. 2017, p. 2437-2449, XP011672843.
ISO/IEC 23008-2:2013, "Information technology—High efficiency coding and media delivery in heterogeneous environments Part 2: High efficiency video coding", Dec. 2013, total 13 pages.
Gary J. Sullivan et al. Overview of the High Efficiency Video Coding (HEVC) Standard, in IEEE Transactions on Circuits and Systems for Video Technology, vol. 22, No. 12, Dec. 2012. pp. 1649-1668.
Qualcomm Incorporated: Study Group 16-Contribution 806, Coding tools investigation for next generation video coding, Jan. 2015, total 7 pages.
X. Ma et al., Crosscheck of JVET-B0022 (ATMVP) (Huawei), Joint Video Exploration Team (JVET) of ITU-T SG 16 WP 3 and ISO/IEC JTC 1/SC 29/WG 11, JVET-B0062, 2nd Meeting: San Diego, USA, Feb. 20-26, 2016, total 4 pages.
S. Lee et al. EE2.6: Modification of Merge candidate derivation: ATMVP simplification and Merge pruning (Qualcomm), Joint Video Exploration Team (JVET) of ITU-T SG 16 WP 3 and ISO/IEC JTC 1/SC 29/WG 11, JVET-C0035, 3rd Meeting: Geneva, CH, May 26-Jun. 1, 2016, total 4 pages.
ITU-T H.265(Feb. 2018), Series H: Audiovisual and Multimedia Systems Infrastructure of audiovisual services—Coding of moving video, High efficiency video coding, Feb. 2018. total 692 pages.
ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.
E.Alshina et al. Performance of JEM1.0 tools analysis by Samsung, Joint Video Exploration Team (JVET) of ITU-T SG 16 WP 3 and ISO/IEC JTC 1/SC 29/WG 11, JVET-B0022_r1, 2nd Meeting: San Diego, USA, Feb. 20-26, 2016, total 28 pages.

* cited by examiner

INTER PREDICTION APPARATUS AND METHOD FOR VIDEO CODING

CROSS-REFERENCE TO RELATED APPLICATIONS

This application is a continuation of International Application No. PCT/RU2018/000190, filed on Mar. 26, 2018, the disclosure of which is hereby incorporated by reference in its entirety.

TECHNICAL FIELD

The present invention relates to the field of video coding. More specifically, the invention relates to an inter prediction apparatus and to a method for video coding as well as an encoding apparatus and a decoding apparatus comprising such an inter prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason, support of video coding standards is a mandatory requirement for almost any video compression application.

The state-of-the-art video coding standards are based on partitioning of a source frame or picture into frame or picture blocks. Processing of these blocks depend on their size, spatial position and a coding mode specified by an encoder. Coding modes can be classified into two groups according to the type of prediction: intra- and inter-prediction modes. Intra-prediction modes use pixels of the same frame (also referred to as picture or image) to generate reference samples to calculate the prediction values for the pixels of the block being reconstructed. Intra-prediction is also referred to as spatial prediction. Inter-prediction modes are designed for temporal prediction and uses reference samples of previous or next frames to predict pixels of the block of the current frame. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similar to the ITU-T H.264/AVC video coding standard, the HEVC/H.265 video coding standard provides for a division of the source frame into frame blocks in the form of so-called coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress.

To reduce the bit-rate of video signals, the ISO and ITU coding standards apply hybrid video coding with motion-compensated prediction combined with transform coding of the prediction error. For each block a motion (or displacement) vector is estimated and transmitted that refers to the corresponding position in previously transmitted reference image. Today's standards H.264/AVC and H.265/HEVC are based on ¼ pel displacement resolution. Now the Joint Video Exploration Team (WET) group is exploring post-HEVC video compression technologies. Some non-uniform motion compensation investigated in the Joint Exploration Model like Advanced Temporal Motion Vector Prediction (ATMVP). The technique relate to derivation of motion information for sub-blocks of blocks of video data. These techniques include deriving the motion information for each of the sub-blocks from motion information of neighboring sub-blocks. The neighboring sub-blocks may include spatially and/or temporally neighboring and/or collocated sub-blocks.

The sub-block level motion field could lead to discontinuities on sub-block borders. In order to eliminate this kind of discontinuities, the reference image has to use a pixel-level (or more precise) motion vector field. To obtain an interpolated image on the fractional-pel positions the interpolation filters are used. The problem of interpolation for non-uniform motion vector distribution within PU is variable fractional-pel displacements.

Sub-block level motion compensation is used as more simple for implementation but provides coarse prediction. Sub-block level motion vector field (MVF) is kept for each reference frame—it is possible to keep it on pixel level—but the size of such level motion field will be extremely high—more than two additional frames in terms of memory—and the memory bandwidth will be increased as well.

Moreover, currently used interpolation filters have own filter for each possible fraction offset. Using pixel level MVF will lead to increasing computational complexity and to complicated implementation.

To improve the quality of prediction the precision of motion compensation was improved by increasing the precision of motion vector displacement for sub-blocks with increasing of amount of interpolation filters. Current accuracy of interpolation filtering for non-uniform motion model still requires to be improved.

Thus, there is a need for an inter prediction apparatus and method for video coding providing an improved video coding efficiency.

SUMMARY

It is an object of the invention to provide an inter prediction apparatus and method for video coding providing an improved video coding efficiency.

The foregoing and other objects are achieved by the subject matter of the independent claims. Further implementation forms are apparent from the dependent claims, the description and the figures.

A first aspect of the invention relates to an apparatus for inter prediction of a sample value of a current pixel of a plurality of pixels of a current block of a current frame of a video signal. The inter prediction apparatus comprises a processing unit configured to: determine a plurality of block-wise motion vectors related one-to-one to a plurality of blocks of the current frame; determine a pixel-wise motion vector of the current pixel based on the plurality of block-wise motion vectors; determine one or more reference pixels in the reference frame based on the pixel-wise motion vector of the current pixel; and determine an inter predicted sample value of the current pixel based on one or more sample values of the one or more reference pixels in the reference frame.

Thus, an improved inter prediction apparatus is provided allowing improving the efficiency for video coding.

In one embodiment, the improved inter prediction apparatus allows performing interpolation with pixel-wise accuracy while keeping the complexity at low level. The motion vector map derived from reference frames with coarse resolution can be improved (enlarged) by simple up-scaling (like bilinear). Having more smooth motion vector field (MVF) with pixel-level resolution the prediction performed by applying techniques not sensitive to variable fractional offsets. As will be described in more detail below, embodiments of the invention allow to: support any kind of non-uniform movements; avoid discontinuities along blocks or sub-blocks; avoid discontinuities along PUs (by using the motion vector from neighboring encoded/reconstructed PUs); keep complexity at a low level; improve the accuracy of interpolation; remove blocking artefacts across block or sub-block edges; reduce memory bandwidth; reuse well optimized in HW bilinear transform; reduce ringing artifacts caused by transforms (on PU resolution having sub-PU motion compensation) while improving quality of interpolated edges; increase subjective quality of edges in reconstructed pictures.

In one embodiment, the plurality of blocks comprises the current block. Inter prediction can thus be made particularly efficient.

In one embodiment, the plurality of blocks comprises a neighboring block of the current block. Inter prediction can thus be made particularly efficient. The neighboring block may notably be one of the following neighboring blocks of the current block: the top left, top, top right, right, bottom right, bottom, bottom left or left neighboring block, for example.

In one embodiment, the processing unit is configured to determine the pixel-wise motion vector for the current pixel by interpolating the components of the plurality of block-wise motion vectors.

In one embodiment, the processing unit is configured to determine the pixel-wise motion vector for the current pixel by interpolation. For example, by using bi-linear interpolation, cubic interpolation, or spline interpolation.

In one embodiment, the current block is a prediction unit (PU) of a coding tree unit (CTU) or a sub-block of a PU of a CTU.

In one embodiment, the current pixel is a full-integer pixel, wherein the processing unit is configured to determine for the current full-integer pixel a corresponding sub-integer pixel in the reference frame on the basis of the pixel-wise motion vector of the current full-integer pixel.

In one embodiment, the processing unit is configured to: generate on the basis of a predefined set of filter support pixels in the current frame a set of corresponding filter support pixels in the reference frame, wherein the predefined set of filter support pixels in the current frame comprises one or more neighboring sub-integer and/or full-integer pixels of the current full-integer pixel; determine a respective sample value of the corresponding sub-integer pixel of the current full-integer pixel and the corresponding filter support pixels in the reference frame; and determine the inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

In one embodiment, the predefined set of filter support pixels in the current frame comprises one or more vertically and/or horizontally neighboring half-integer pixels of the current pixel in the current frame.

In one embodiment, the predefined set of filter support pixels in the current frame comprises one or more vertically and/or horizontally neighboring full-integer pixels of the current full-integer pixel in the current frame.

In one embodiment, the spatial high-pass filter is a 5-tap filter. More specifically, the spatial high-pass filter is a 5-tap filter in the half pixel domain. It thus corresponds to a 3-tap filter in the pixel domain. In an implementation form, the 5-tap filter is a symmetric filter, i.e. a filter where the first and the fifth filter coefficients are identical and the second and the fourth filter coefficients are identical. In an implementation form, the first and the fifth filter coefficients are negative, while the other filter coefficients of the 5-tap filter are positive.

In one embodiment, the spatial high-pass filter is a 3-tap filter.

In one embodiment, the processing unit of the apparatus is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame.

A second aspect of the invention relates to a method for inter prediction of a sample value of a current pixel of a plurality of pixels of a current block of a current frame of a video signal. The method comprises: determining a plurality of block-wise motion vectors related one-to-one to a plurality of blocks of the current frame; determining a pixel-wise motion vector of the current pixel based on the plurality of block-wise motion vectors; determining one or more reference pixels in the reference frame based on the pixel-wise motion vector of the current pixel; and determining an inter predicted sample value of the current pixel based on one or more sample values of the one or more reference pixels in the reference frame.

The inter prediction method according to the second aspect of the invention can be performed by the inter prediction apparatus according to the first aspect of the invention. Further features of the inter prediction method according to the second aspect of the invention result directly from the functionality of the inter prediction apparatus according to the first aspect of the invention and its different implementation forms described above and below.

A third aspect of the invention relates to an encoding apparatus for encoding a current frame of a video signal, wherein the encoding apparatus comprises an inter prediction apparatus according to the first aspect of the invention.

A fourth aspect of the invention relates to a decoding apparatus for decoding a current reconstructed frame of a compressed video signal, wherein the decoding apparatus comprises an inter prediction apparatus according to the first aspect of the invention.

A fifth aspect of the invention relates to a computer program product comprising program code for performing the method according to the second aspect when executed on a computer or a processor.

BRIEF DESCRIPTION OF THE DRAWINGS

Further embodiments of the invention will be described with respect to the following figures, wherein.

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the invention may be placed. It is understood that other aspects may be utilized and structural or logical changes may be made without departing from the scope of the invention. The following detailed description, therefore, is not to be taken in a limiting sense, as the scope of the invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
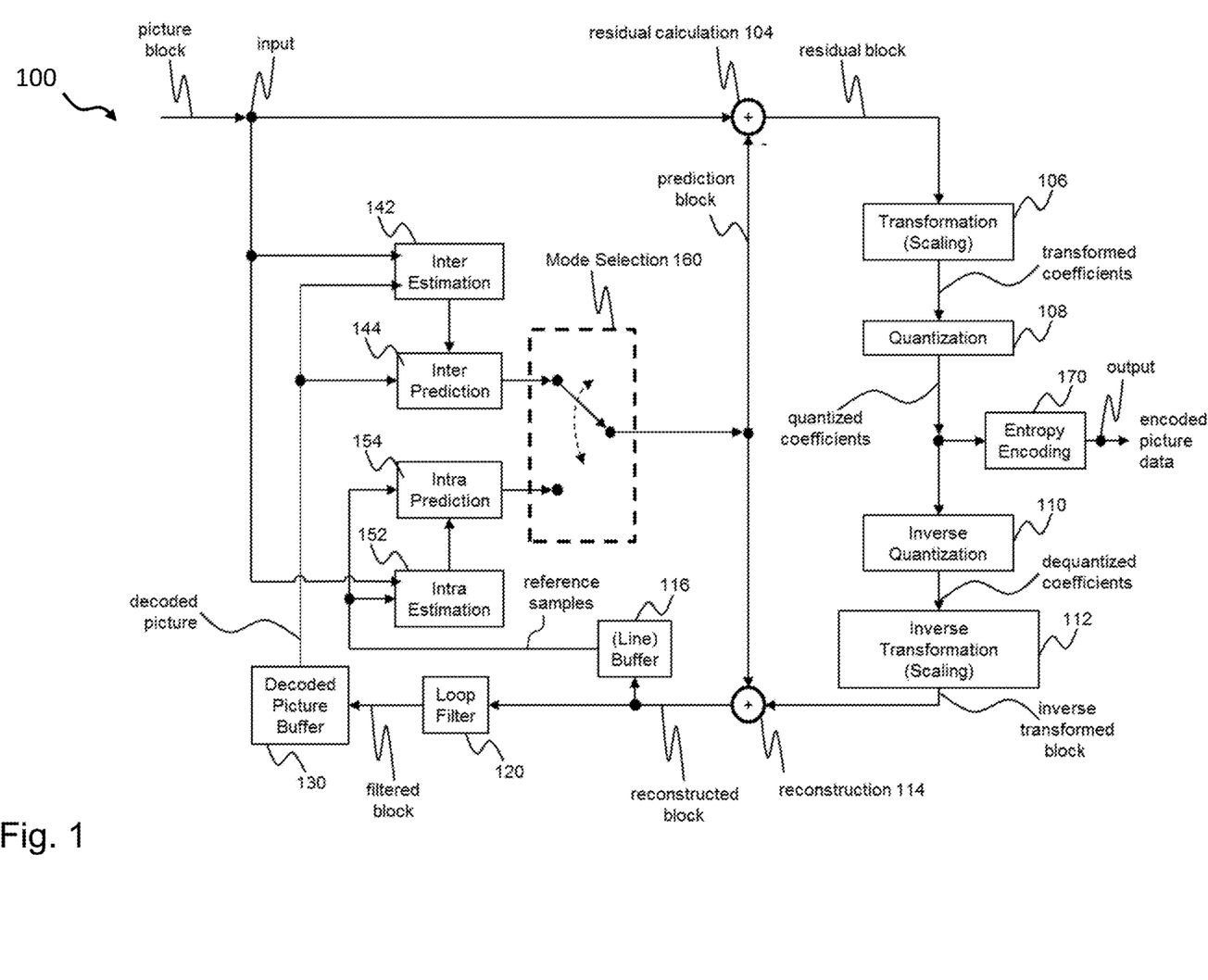
FIG. 1 shows a schematic diagram illustrating an encoding apparatus according to an embodiment comprising an inter prediction apparatus according to an embodiment.

FIG. 1 shows an encoding apparatus 100 according to an embodiment comprising an inter prediction apparatus 144 according to an embodiment. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, coding tree units, coding units, prediction units and/or prediction blocks.

In one embodiment, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 2 further comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. Generally, the inter prediction unit 144 can be configured to perform motion compensation of a block based on motion estimation, as will be described in more detail further below. In an embodiment, the motion estimation can be performed by an inter estimation unit 142 of the encoding apparatus. However, in other embodiments, the functionality of the inter estimation unit 142 can be implemented as part of the inter prediction unit 144 as well.

Furthermore, in the hybrid encoder embodiment shown in FIG. 1 a residual calculation unit 104 determines the difference between the original block and its prediction, i.e. the residual block defining the prediction error of the intra/inter picture prediction. This residual block is transformed by the transformation unit 106 (for instance using a discrete cosine transform or DCT) and the transformation coefficients are quantized by the quantization unit 108. The output of the quantization unit 108 as well as the coding or side information provided, for instance, by the inter prediction unit 144 are further encoded by an entropy encoding unit 170.

A hybrid video encoder, such as the encoding apparatus 100 shown in FIG. 1, usually duplicates the decoder processing such that both will generate the same predictions. Thus, in the embodiment shown in FIG. 1 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by an in-loop filter 120 for removing image artifacts. The final picture is stored in a decoded picture buffer 130 and can be used as a reference frame for the inter prediction of subsequent frames.

Figure 2:
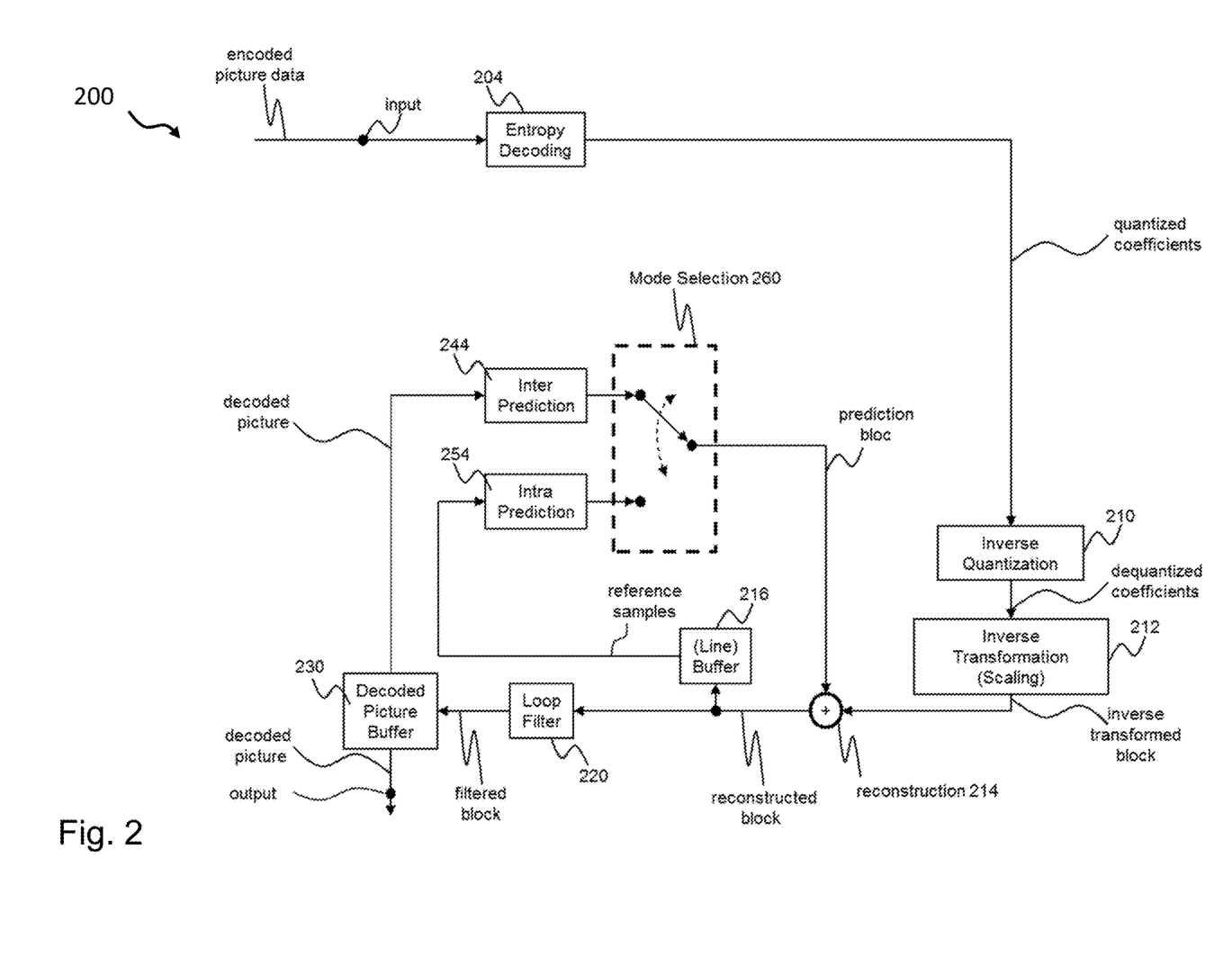
FIG. 2 shows a schematic diagram illustrating a decoding apparatus according to an embodiment comprising an inter prediction apparatus according to an embodiment.
Figure 3:
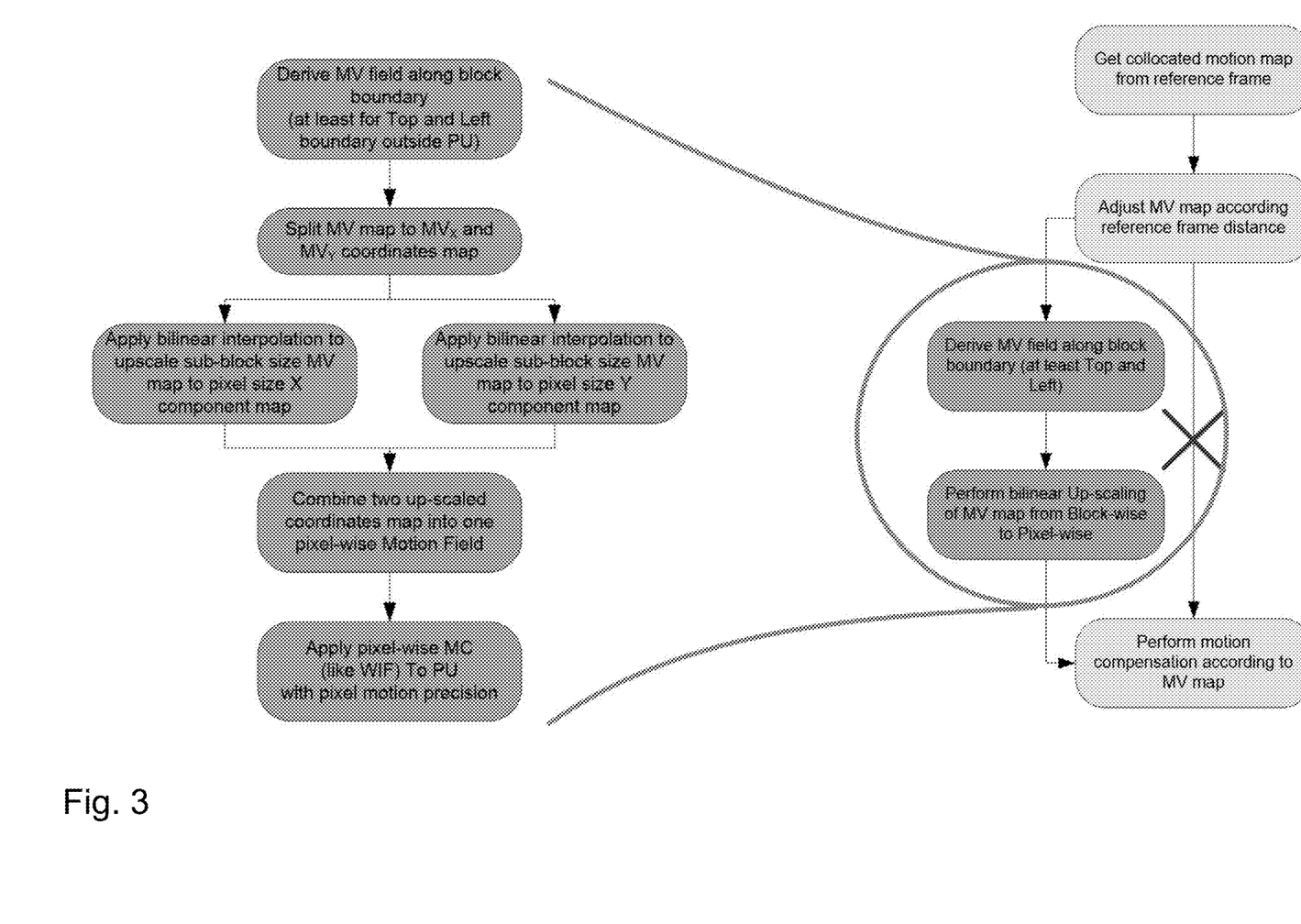
FIG. 3 shows a schematic diagram illustrating different aspects of a motion vector interpolation scheme implemented in an inter prediction apparatus according to an embodiment.

FIG. 2 shows a decoding apparatus 200 according to an embodiment comprising an inter prediction apparatus 244 according to an embodiment. The decoding apparatus 200 is configured to decode a block of a frame of an encoded video signal. In the embodiment shown in FIG. 2 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for the inter prediction apparatus 244 and an intra prediction unit 254 as well as other components of the decoding apparatus 200. In the embodiment shown in FIG. 2, the inter prediction apparatus 244 or the intra prediction unit 254 of the decoding apparatus 200 shown in FIG. 3 are selected by a mode selection unit 260 and function in the same way as the inter prediction apparatus 144 and the intra prediction unit 154 of the encoding apparatus 100 shown in FIG. 1, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the in-loop filter 220 for future inter predictions.

As already described above, the apparatus 144, 244 is configured to perform an inter prediction of a sample value of a current pixel of a plurality of pixels of a current block of a current frame of a video signal. The apparatus 144, 244 comprises a processing unit, which can be implemented in software and/or hardware.

As illustrated in FIG. 3 and as will be described in more detail further below, the processing unit of the inter-prediction apparatus 144, 244 is configured to: determine a plurality of block-wise motion vectors related one-to-one to a plurality of blocks of the current frame; determine a pixel-wise motion vector of the current pixel based on the plurality of block-wise motion vectors; determine one or more reference pixels in the reference frame based on the pixel-wise motion vector of the current pixel; and determine an inter predicted sample value of the current pixel based on one or more sample values of the one or more reference pixels in the reference frame.

For example, the inter-prediction apparatus 144, 244 may be configured to determine on the basis of the current frame and a reference frame of the video signal at least one block-wise motion vector for the current block and for at least one further block, preferably a neighboring block of the current block, at least one further block-wise motion vector; determine for the current pixel a pixel-wise motion vector on the basis of the at least one block-wise motion vector for the current block and the at least one further block-wise motion vector for the at least one further block, preferably neighboring block of the current block; determine the inter predicted sample value of the current pixel in the current frame on the basis of the pixel-wise motion vector and a sample value of a pixel in the reference frame corresponding to the current pixel in the current frame.

In an embodiment, the processing unit of the inter-prediction apparatus 144, 244 is configured to determine the pixel-wise motion vector for the current pixel using bi-linear interpolation or another form of interpolation. In an embodiment, the at least one neighboring block of the current block comprises at least one neighboring block to the top left, top, top right, right, bottom right, bottom, bottom left or left of the current block. In an embodiment, the current block can be sub-block of a larger block and/or a prediction unit (PU) of a coding tree unit (CTU).

For instance, in an embodiment, the processing unit of the inter-prediction apparatus 144, 244 can determine the pixel-wise motion vector for a current pixel located in the upper left quadrant of a current block on the basis of the block-wise motion vector of the current block and the block-wise motion vectors of the neighboring blocks to the left, top left and top of the current block. For determining the pixel-wise motion vector using bi-linear interpolation the processing unit of the inter-prediction apparatus 144, 244 can determine the respective vertical and/or horizontal distances between the current pixel located in the upper left quadrant of the current block and the respective central pixels of the current block and the neighboring blocks to the left, top left and top of the current block and weight the respective block-wise motion vectors accordingly, e.g., according to the distance (in both axis) from the pixel whose MV is determined to the centers of adjacent sub-blocks with known MVs or extrapolated ones.

Figure 4A:
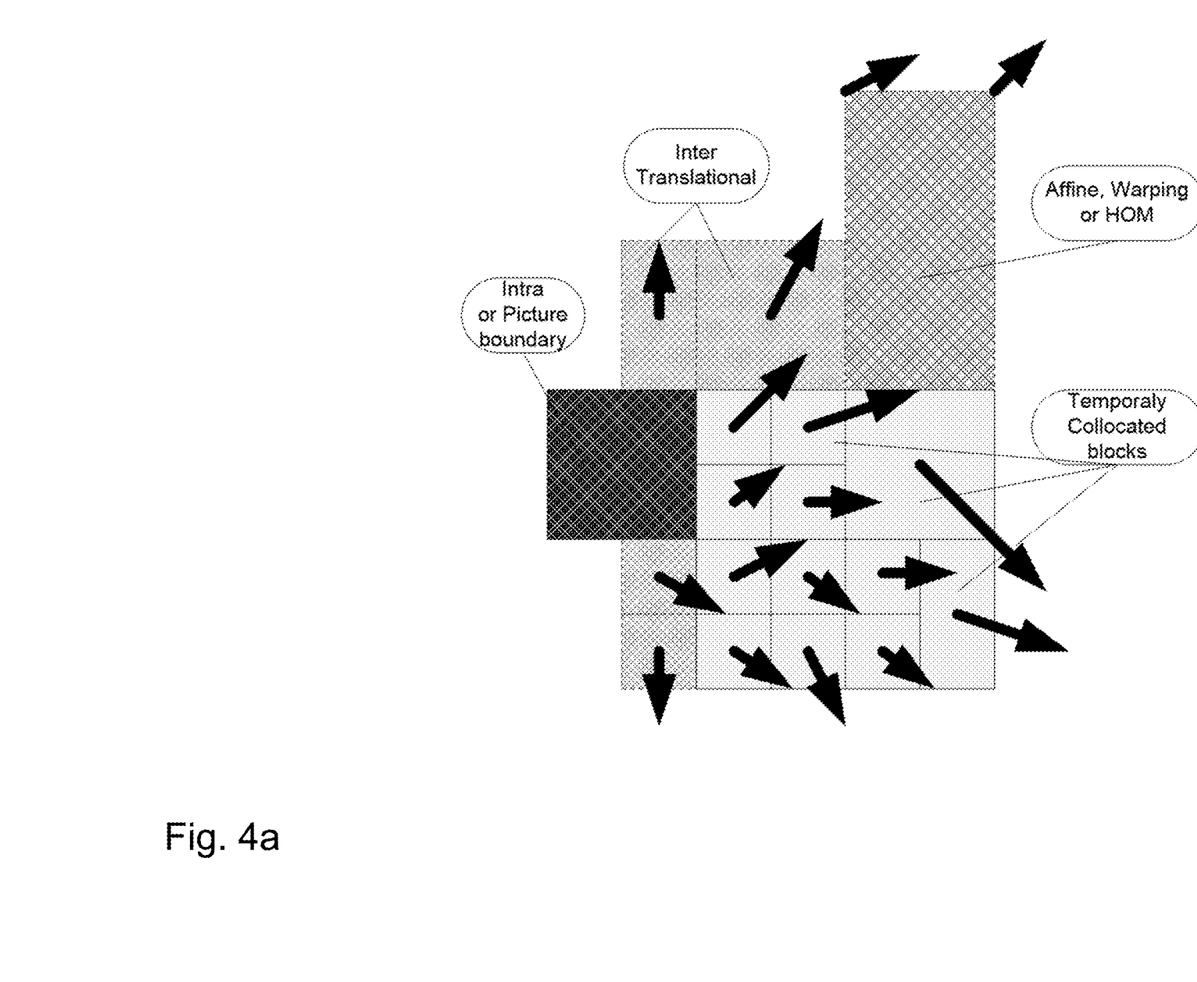
FIGS. 4a, 4b, and 4c show schematic diagrams illustrating different aspects of a motion vector interpolation scheme implemented in an inter prediction apparatus according to an embodiment.
Figure 4B:
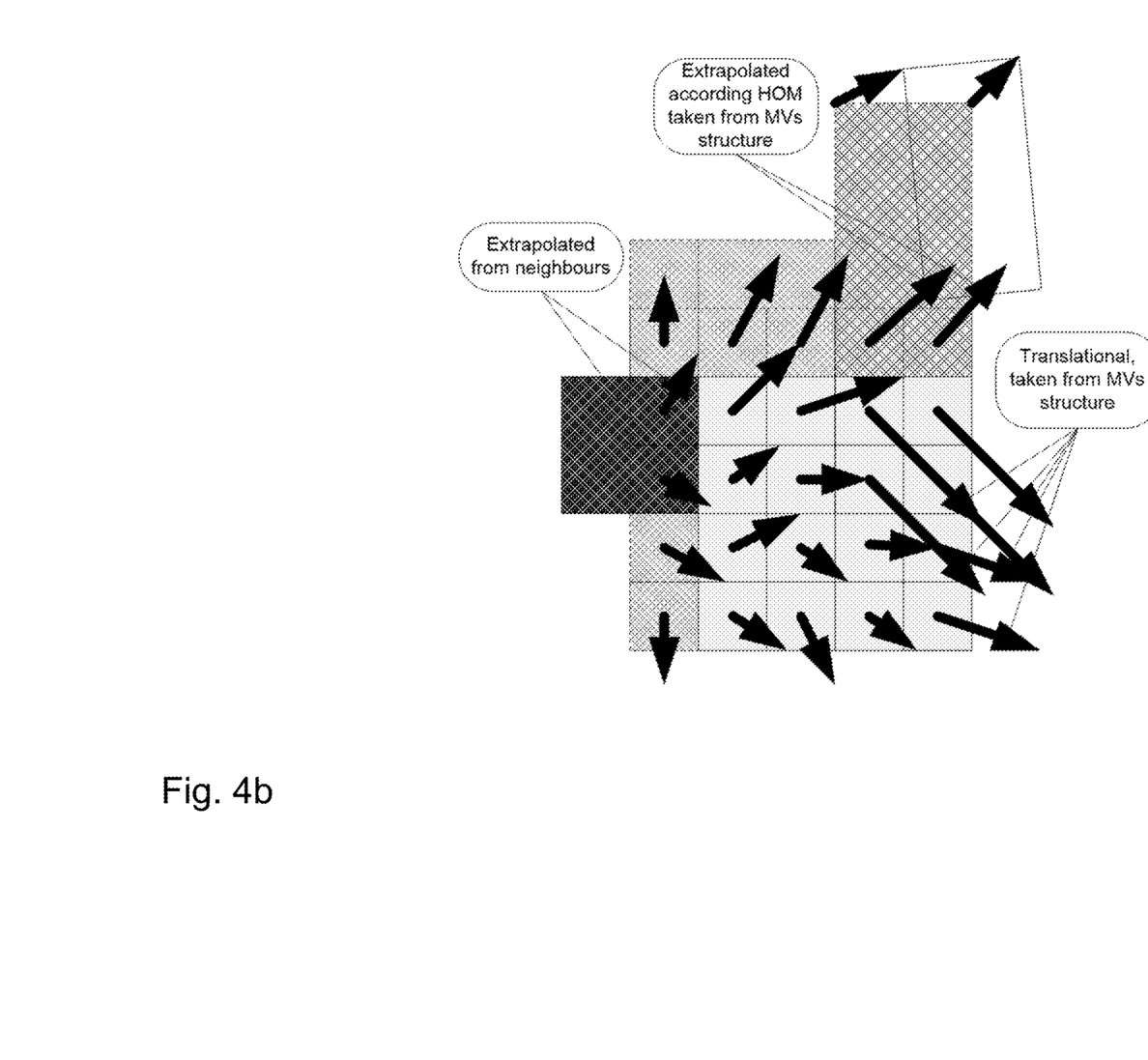
Figure 4C:
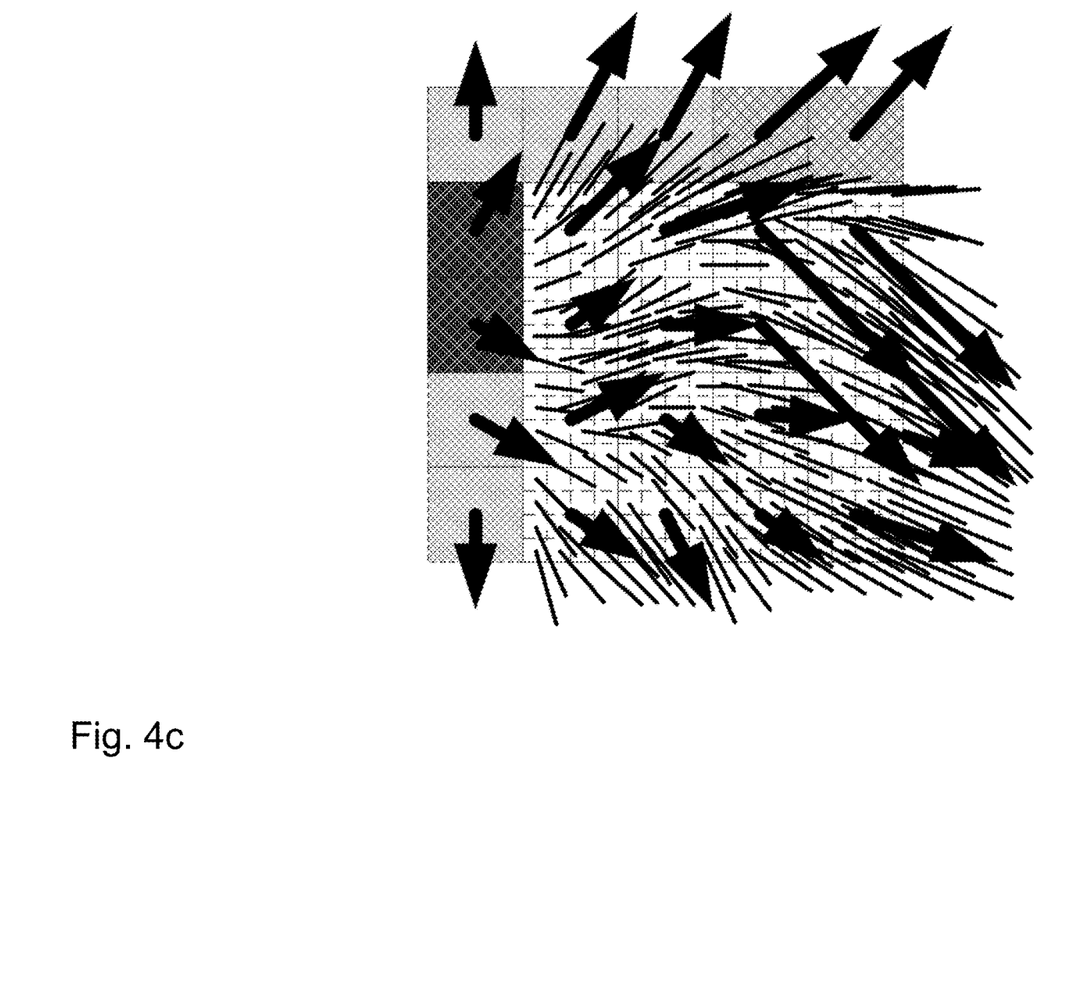

FIGS. 4a, 4b, and 4c show schematic diagrams illustrating several of the aspects described above as well as further aspects of the inter-prediction apparatus 144, 244 according to an embodiment. FIG. 4a shows a plurality of exemplary block-wise motion vectors of a plurality of exemplary blocks of a video stream. FIG. 4b shows a block-wise motion vector field derived and extrapolated by the inter-prediction apparatus 144, 244 and stored in the buffer 116, 216 of the encoding apparatus 100 and/or the decoding apparatus. FIG. 4c, which shows a detailed view of FIGS. 4a and 4b, illustrates an exemplary pixel-wise motion vector field derived by the inter-prediction apparatus 144, 244 using by way of example bi-linear interpolation. More specifically, FIG. 4c shows the derived pixel-wise motion vectors for each of the 4×4 pixels of each of the 4×4 blocks to the lower right of the plurality of blocks shown therein.

In an embodiment the processing unit of the inter-prediction apparatus 144, 244 is configured to determine the pixel-wise motion vector for the current pixel by interpolating the component of the block-wise motion vector for the current block and the components of the further block-wise motion vector for the at least one neighboring block of the current block.

In an embodiment, the processing unit of the inter-prediction apparatus 144, 244 is configured to use the pixel-wise motion vector for determining the inter predicted sample value of the current full-integer pixel in the current frame on the basis of a corresponding sub-integer pixel in the reference frame.

The processing unit of the apparatus 144, 244 is further configured to generate on the basis of a predefined set of filter support pixels in the current frame a set of corresponding filter support pixels in the reference frame. The predefined set of filter support pixels in the current frame comprises one or more neighboring sub-integer and/or full-integer pixels of the current full-integer pixel.

In an embodiment, the predefined set of filter support pixels in the current frame comprises one or more vertically and/or horizontally neighboring half-integer pixels of the current full-integer pixel in the current frame. For instance, in an embodiment the predefined set of filter support pixels in the current frame comprises the neighboring half-integer pixels above, to the left of, below and to the right of the current full-integer pixel.

In an embodiment, the predefined set of filter support pixels in the current frame further comprises one or more vertically and/or horizontally neighboring full-integer pixels of the current full-integer pixel in the current frame. For instance, in an embodiment the predefined set of filter support pixels in the current frame further comprises the neighboring full-integer pixels above, to the left of, below and to the right of the current full-integer pixel. Thus, in an embodiment, the predefined set of filter support pixels in the current frame can comprise the neighboring half-integer and/or full-integer pixels above, to the left of, below and to the right of the current full-integer pixel in the current frame.

The processing unit of the apparatus 144, 244 is further configured to determine a respective sample value, in particular a luminance value of the corresponding sub-integer pixel of the current full-integer pixel and the corresponding filter support pixels in the reference frame.

Figure 5:
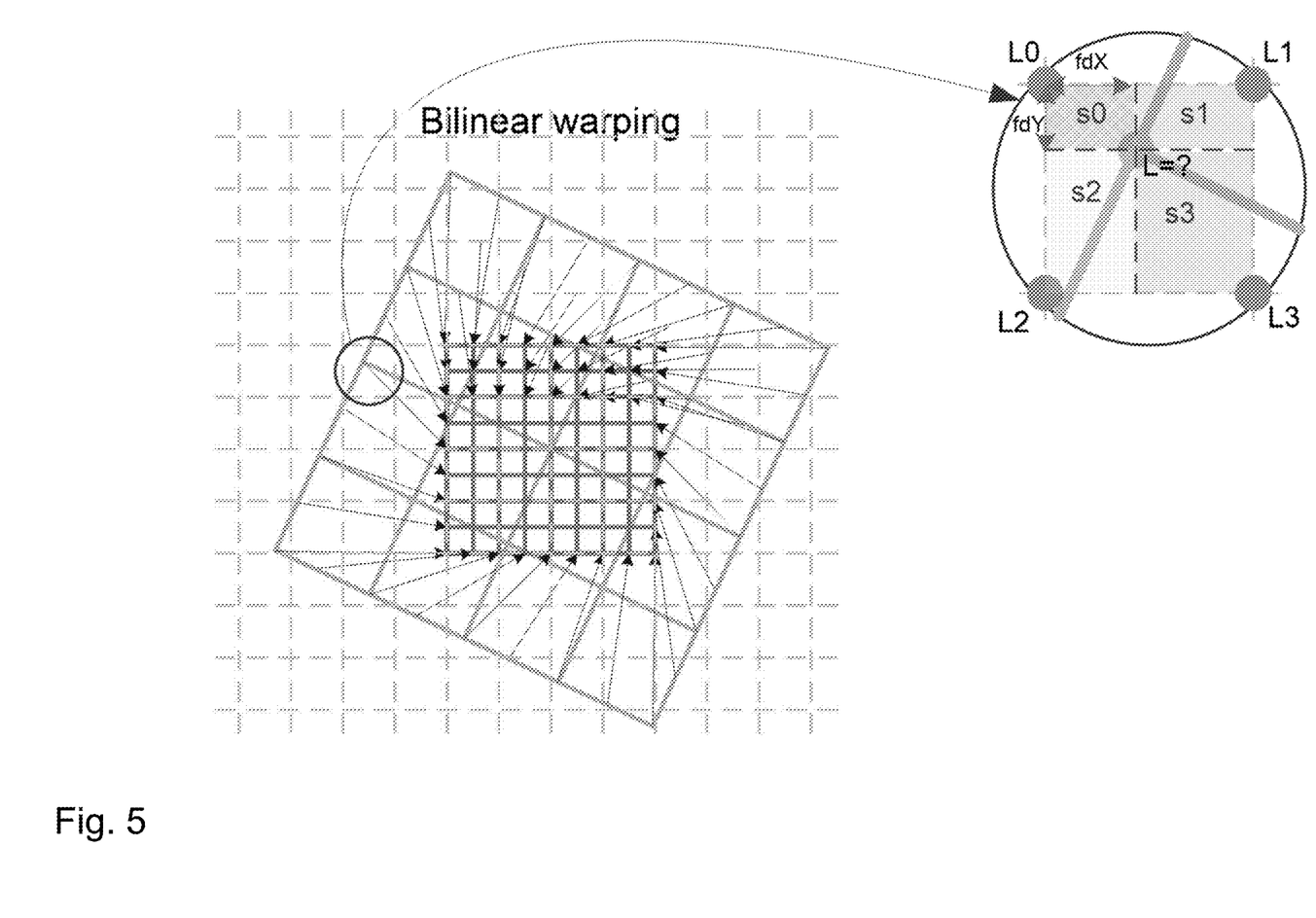
FIG. 5 shows a schematic diagram illustrating different aspects of a sample value interpolation scheme implemented in an inter prediction apparatus according to an embodiment.

In an embodiment, the processing unit of the apparatus 144, 244 is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame. FIG. 5 illustrates an example of using bilinear interpolation for determining the sample value of the corresponding sub-integer pixel of the current full-integer pixel in the reference frame. In FIG. 5, a reference block in the reference frame is enlarged and rotated relative to a current block comprising an exemplary current pixel of the current frame. Moreover, FIG. 5 illustrates the increased resolution used for the filter support pixels.

As can be taken from the enlarged view in FIG. 5, in an embodiment the sample value L of the corresponding sub-integer pixel of the current full-integer pixel in the reference frame can be determined by the processing unit as follows. The corresponding sub-integer pixel of the current full-integer pixel has the fractional position (fdX, fdY) in a corresponding cell of the sample grid of the reference frame. L0, L1, L2, L3 are the known sample values of the neighboring full-integer pixels in the reference frame (i.e. the full-integer pixels located at the corners of the corresponding cell of the sample grid of the reference frame the corresponding sub-integer pixel of the current full-integer pixel is located in). On the basis of the fractional position (fdX, fdY) the respective areas of the rectangles corresponding to s0, s1, s2, s3 can be calculated as follows: s0=fdX*fdY, s1=(1−fdX)*fdY, s2=fdX*(1−fdY), s3=(1−fdX)*(1−fdY). Bilinear interpolation can be expressed using a 2-tap filter having the following horizontal coefficients (1−fdX, fdX) and the following vertical coefficients (1−fdY, fdY). On the basis of these weighting factors the sample value L of the corresponding sub-integer pixel of the current full-integer pixel in the reference frame can be determined on the basis of the following equation:

L=L0*s3+L1*s2+L2*s1+L3*s0. As already mentioned above, the same bilinear interpolation can be used for determining the sample values for the corresponding filter support pixels in the reference frame and/or the components of the pixel-wise motion vector.

The processing unit of the apparatus 144, 244 is further configured to determine an inter predicted sample value of the current pixel in the current frame by applying a spatial high-pass filter to the sample value of the corresponding sub-integer pixel of the current full-integer pixel in the reference frame and to the sample values of the corresponding filter support pixels in the reference frame.

In an embodiment, the spatial high-pass filter is a 5-tap filter. In an embodiment, the 5-tap filter is a symmetric filter, i.e. a filter where the first and the fifth filter coefficients are identical and the second and the fourth filter coefficients are identical. In an embodiment, the first and the fifth filter coefficients are negative, while the other filter coefficients of the 5-tap filter are positive. In an embodiment, the spatial high-pass filter can be applied separately in the vertical and the horizontal direction.

Figure 6:
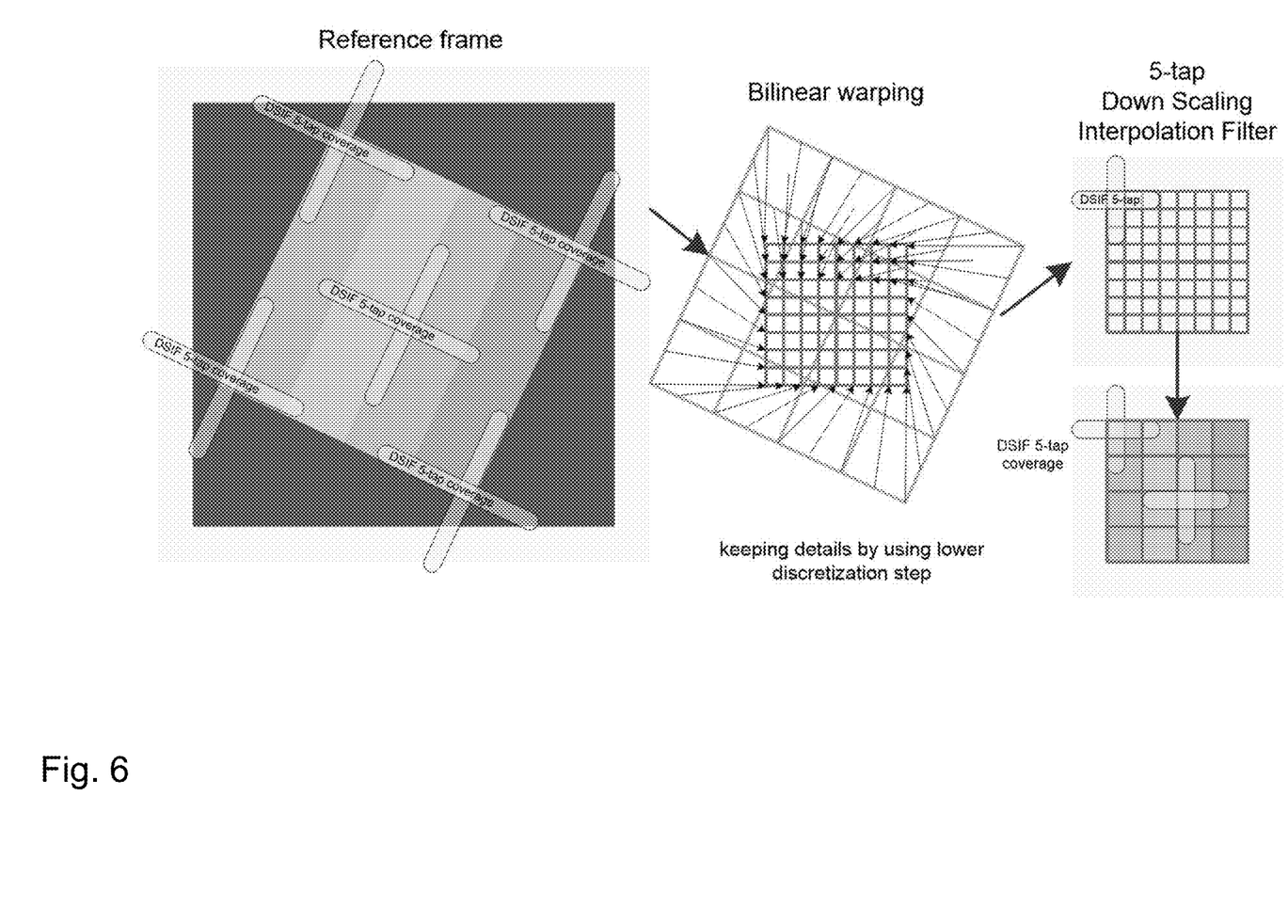
FIG. 6 shows a schematic diagram illustrating different aspects of a sample value interpolation scheme implemented in an inter prediction apparatus according to an embodiment.

FIG. 6 illustrates different stages of the processing unit performed by the processing unit of the apparatus 144, 244 using a 5-tap filter in the vertical and the horizontal direction for the example shown in FIG. 5. As in the example shown in FIG. 5, the reference block is enlarged and rotated (corresponding to an affine transformation) relative to the current block, the 5-tap filters, which are vertical and horizontal in the current frame, are rotated in the reference frame.

In the following further embodiments of the inter prediction apparatus 144, 244, the encoding apparatus 100 and the decoding apparatus 200 will be described. In this context it will be understood that embodiments of the inter prediction apparatus 144, 244 relate to embodiments of the inter prediction apparatus 144 as implemented in the encoding apparatus 100 as well as embodiments of the inter prediction apparatus 244 as implemented in the decoding apparatus 200.

In an embodiment, the processing unit of the inter prediction apparatus 144, 244 is further configured to derive by extrapolation, block-wise motion vectors for one or more of the neighbouring blocks of the current block. For instance, if at least one MV is already known for at least one neighbouring block, this MV may be used as the MV for other neighbouring blocks with absent MV data. Alternatively, the MV of neighbouring blocks without MV data may be set to the null vector (for instance, in case all neighbouring blocks do not contain any MV data).

In an embodiment, the encoding apparatus 100 is configured to signal to the decoding apparatus 200 that the inter predicted sample value of the current pixel in the current frame has been determined on the basis of the pixel-wise motion vector, as described above, using an additional merge mode or one of the known merge indexes.

Figure 7:
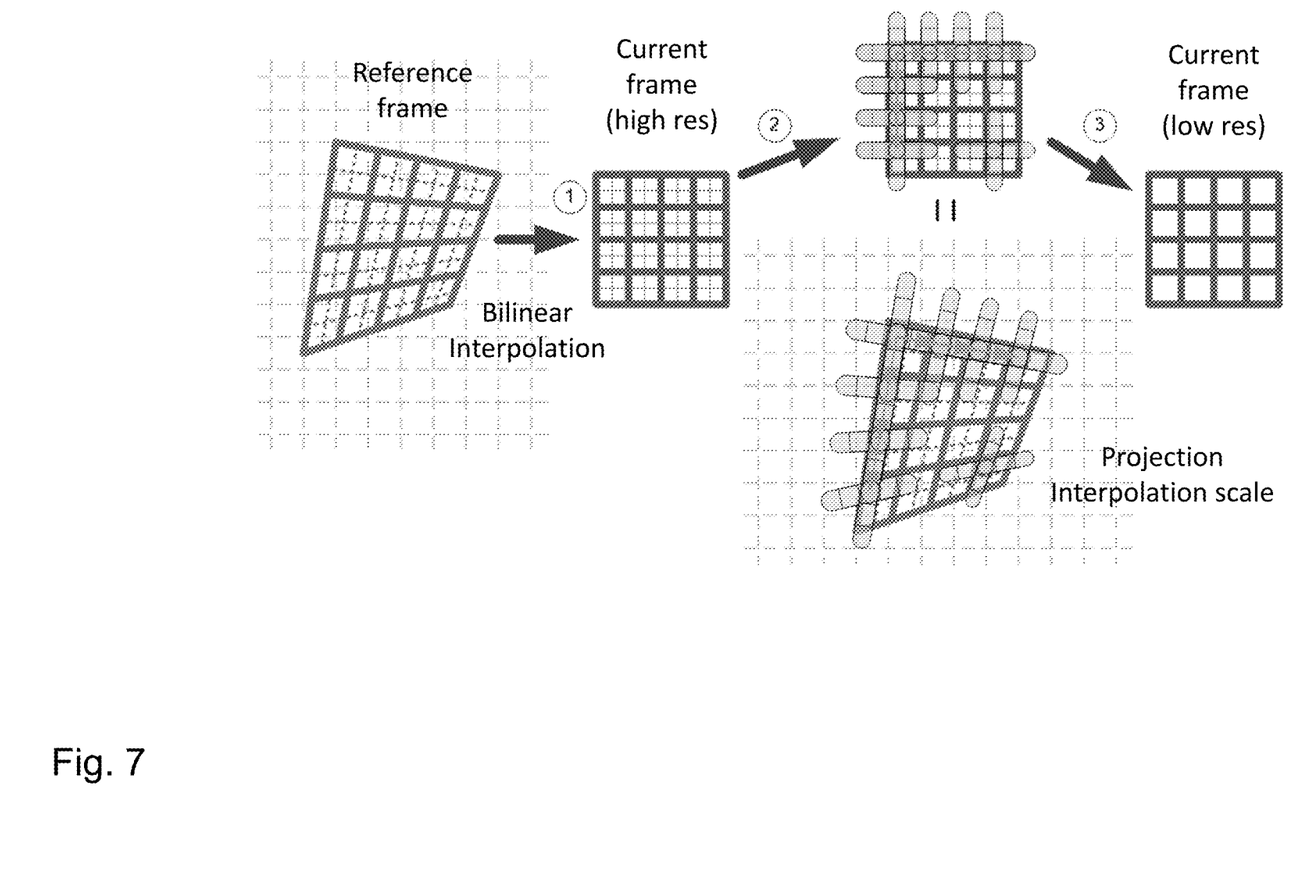
FIG. 7 shows a schematic diagram illustrating different aspects of a sample value interpolation scheme implemented in an inter prediction apparatus according to an embodiment.

FIG. 7 summarizes several aspects of embodiments of the invention described above.

Figure 8:
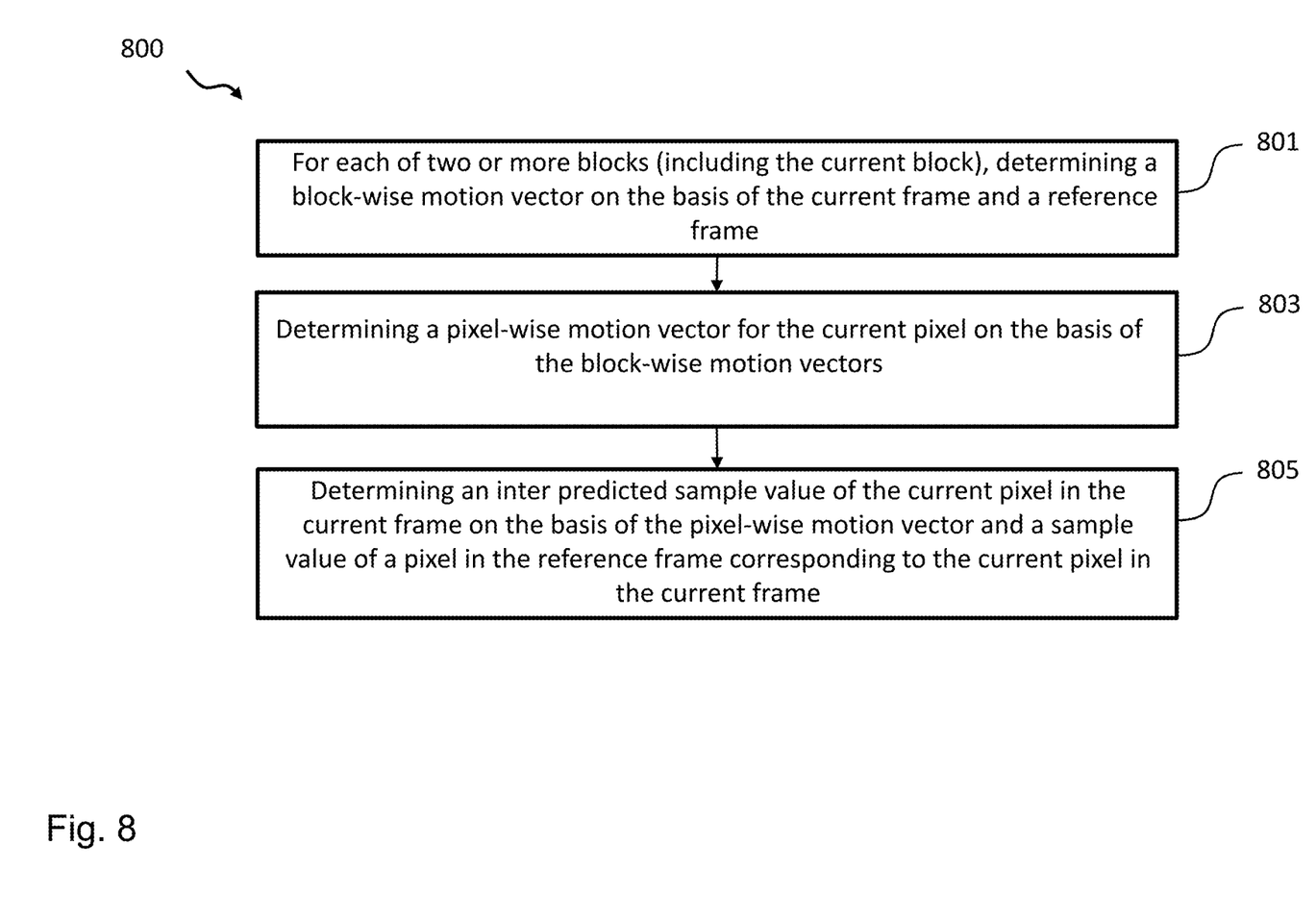
FIG. 8 shows a flow diagram illustrating steps of an inter prediction method according to an embodiment.

FIG. 8 shows a flow diagram illustrating steps of an example of an embodiment of an inter prediction method 800. In this example, the method 800 comprises the following operations: determining 801 on the basis of the current frame and a reference frame of the video signal at least one block-wise motion vector for the current block and for at least one further block, preferably a neighboring block of the current block, at least one further block-wise motion vector; determining 803 for the current pixel a pixel-wise motion vector on the basis of the at least one block-wise motion vector for the current block and the at least one further block-wise motion vector for the at least one further block, preferably neighboring block of the current block; and determining 805 the inter predicted sample value of the current pixel in the current frame on the basis of the pixel-wise motion vector and a sample value of a pixel in the reference frame corresponding to the current pixel in the current frame.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the invention has been described with reference to one or more particular embodiments, those skilled in the art recognize that many changes may be made thereto without departing from the scope of the invention. It is therefore to be understood that within the scope of the appended claims and their equivalents, the invention may be practiced otherwise than as specifically described herein.

The invention claimed is:

1. An apparatus for inter prediction of a sample value of a current pixel of a current block of a current frame of a video signal, the apparatus comprising:
one or more processors; and a non-transitory computer-readable storage medium coupled to the processors and storing a program for execution by the processors, wherein the program, when executed by the processors, causes a decoder to:
determine a plurality of block-wise motion vectors related one-to-one to a plurality of blocks of the current frame;
determine a pixel-wise motion vector of the current pixel based on the plurality of block-wise motion vectors, wherein the current pixel is a full-integer pixel;
determine for the current pixel a corresponding sub-integer pixel in a reference frame on the basis of the pixel-wise motion vector of the current pixel;
generate, on the basis of a predefined set of filter support pixels in the current frame, a set of corresponding filter support pixels in the reference frame, wherein the predefined set of filter support pixels in the current frame comprises one or more neighboring sub-integer and/or full-integer pixels of the current full-integer pixel;
determine a respective sample value of the corresponding sub-integer pixel of the current full-integer pixel and the corresponding filter support pixels in the reference frame; and
determine an inter predicted sample value of the current pixel in the current frame by applying a spatial high-pass filter to the respective sample value of the corresponding sub-integer pixel of the current full-integer pixel in the reference frame and to the sample values of the corresponding filter support pixels in the reference frame.

2. The apparatus of claim 1, wherein the plurality of blocks comprises the current block.

3. The apparatus of claim 1, wherein the plurality of blocks comprises a neighboring block of the current block.

4. The apparatus of claim 1, wherein the decoder is configured to determine the pixel-wise motion vector for the current pixel by interpolating components of the plurality of block-wise motion vectors.

5. The apparatus of claim 1, wherein the decoder is configured to determine the pixel-wise motion vector for the current pixel by interpolation.

6. The apparatus of claim 1, wherein the current block is one of:
a prediction unit of a coding tree unit, or
a sub-block of a prediction unit of the coding tree unit.

7. The apparatus of claim 1, wherein the predefined set of filter support pixels in the current frame comprises one or more vertically and/or horizontally neighboring half-integer pixels of the current pixel in the current frame.

8. The apparatus of claim 1, wherein the predefined set of filter support pixels in the current frame comprises one or more vertically and/or horizontally neighboring full-integer pixels of the current full-integer pixel in the current frame.

9. The apparatus of claim 1, wherein the spatial high-pass filter is a 5-tap filter.

10. The apparatus of claim 1, wherein the spatial high-pass filter is a 3-tap filter.

11. The apparatus of claim 1, wherein the decoder is configured to determine the respective sample values of the corresponding sub-integer pixel of the current full-integer pixel in the reference frame and of the corresponding filter support pixels in the reference frame on the basis of a bilinear interpolation of the respective neighboring full-integer pixels in the reference frame.

12. A method for inter prediction of a sample value of a current pixel of a plurality of pixels of a current block of a current frame of a video signal, the method comprising:
determining a plurality of block-wise motion vectors related one-to-one to a plurality of blocks of the current frame;
determining a pixel-wise motion vector of the current pixel based on the plurality of block-wise motion vectors, wherein the current pixel is a full-integer pixel;
determining for the current pixel a corresponding sub-integer pixel in a reference frame on the basis of the pixel-wise motion vector of the current pixel;
generating, on the basis of a predefined set of filter support pixels in the current frame, a set of corresponding filter support pixels in the reference frame, wherein the predefined set of filter support pixels in the current frame comprises one or more neighboring sub-integer and/or full-integer pixels of the current full-integer pixel;
determining a respective sample value of the corresponding sub-integer pixel of the current full-integer pixel and the corresponding filter support pixels in the reference frame; and
determining an inter predicted sample value of the current pixel in the current frame by applying a spatial high-pass filter to the respective sample value of the corresponding sub-integer pixel of the current full-integer pixel in the reference frame and to the sample values of the corresponding filter support pixels in the reference frame.

13. The method of claim 12, wherein the plurality of blocks comprises the current block.

14. The method of claim 12, wherein the plurality of blocks comprises a neighboring block of the current block.

15. The method of claim 12, wherein the decoder is configured to determine the pixel-wise motion vector for the current pixel by interpolating components of the plurality of block-wise motion vectors.

16. The method of claim 12, wherein the decoder is configured to determine the pixel-wise motion vector for the current pixel by interpolation.

17. Non-transitory machine readable medium having instructions stored therein, which when executed by a processor, cause the processor to perform operations of inter prediction of a sample value of a current pixel of a plurality of pixels of a current block of a current frame of a video signal, the operations comprising:

determining a plurality of block-wise motion vectors related one-to-one to a plurality of blocks of the current frame;

determining a pixel-wise motion vector of the current pixel based on the plurality of block-wise motion vectors, wherein the current pixel is a full-integer pixel;

determining for the current pixel a corresponding sub-integer pixel in a reference frame on the basis of the pixel-wise motion vector of the current pixel;

generating, on the basis of a predefined set of filter support pixels in the current frame, a set of corresponding filter support pixels in the reference frame, wherein the predefined set of filter support pixels in the current frame comprises one or more neighboring sub-integer and/or full-integer pixels of the current full-integer pixel;

determining a respective sample value of the corresponding sub-integer pixel of the current full-integer pixel and the corresponding filter support pixels in the reference frame; and determining an inter predicted sample value of the current pixel in the current frame by applying a spatial high-pass filter to the respective sample value of the corresponding sub-integer pixel of the current full-integer pixel in the reference frame and to the sample values of the corresponding filter support pixels in the reference frame.

18. The non-transitory machine readable medium of claim 17, wherein the plurality of blocks comprises the current block.

* * * * *